(12) United States Patent
Kumar et al.

(10) Patent No.: US 10,691,901 B2
(45) Date of Patent: Jun. 23, 2020

(54) SEQUENCE GENERATION USING NEURAL NETWORKS WITH CONTINUOUS OUTPUTS

(71) Applicant: Carnegie Mellon University, Pittsburgh, PA (US)

(72) Inventors: Sachin Kumar, Pittsburgh, PA (US); Yulia Tsvetkov, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 16/509,930

(22) Filed: Jul. 12, 2019

(65) Prior Publication Data

US 2020/0019614 A1 Jan. 16, 2020

Related U.S. Application Data

(60) Provisional application No. 62/697,654, filed on Jul. 13, 2018.

(51) Int. Cl.
*G06F 40/58* (2020.01)
*G06N 3/04* (2006.01)
*G06N 3/08* (2006.01)

(52) U.S. Cl.
CPC ........... *G06F 40/58* (2020.01); *G06N 3/0445* (2013.01); *G06N 3/0454* (2013.01); *G06N 3/08* (2013.01)

(58) Field of Classification Search
CPC .................................................... G06F 17/289
USPC ............................................................ 704/2
See application file for complete search history.

(56) References Cited

U.S. PATENT DOCUMENTS

| | | | | |
|---|---|---|---|---|
| 2008/0263663 | A1* | 10/2008 | Ide | G06F 16/35 726/22 |
| 2010/0082639 | A1* | 4/2010 | Li | G06F 16/334 707/748 |
| 2018/0018590 | A1* | 1/2018 | Szeto | G06F 21/6254 |
| 2018/0203852 | A1* | 7/2018 | Goyal | G06F 17/2881 |
| 2019/0258925 | A1* | 8/2019 | Li | G06N 3/08 |

OTHER PUBLICATIONS

Andreas et al., "On the Accuracy of Self-Normalized Log-Linear Models," In *Proc.* NIPS, pp. 1-9, 2015.
Bandanau et al., "Neural Machine Translation by Jointly Learning to Align and Translate," ICLR, pp. 1-15, 2015.
(Continued)

*Primary Examiner* — Jakieda R Jackson
(74) *Attorney, Agent, or Firm* — K&L Gates LLP

(57) ABSTRACT

A machine learning system including a continuous embedding output layer is provided. Whereas traditional machine language translation or generation models utilize an output layer that include an single output for each word in the output vocabulary V, the present machine learning system includes a continuous embedding output layer that stores continuous vectors mapped to an m-dimensional vector space, where m is less than V. Accordingly, the present machine learning system processes an input string to produce an output vector and then searches for the continuous vector within the vector space that most closely corresponding to the output vector via, for example, a k-nearest neighbor algorithm. The system then outputs the output string corresponding to the determined continuous vector. The present system can be trained utilizing a cosine-based loss function.

17 Claims, 4 Drawing Sheets

(56) References Cited

OTHER PUBLICATIONS

Bengio et al., "Quick Training of Probabilistic Neural Nets by Importance Sampling," In *Proc.* AISTATS, pp. 1-9, 2003.
Bishop et al., "Mixture Density Networks," Technical Report, pp. 1-26, 1994.
Bojansowski et al., "Enriching Word Vectors with Subword Information," Transactions of the Association for Computational Linguistics, vol. 5, pp. 135-146, 2017.
Chen et al., "Strategies for Training Large Vocabulary Neural Language Models," In *Proc.* ACL, 2016.
De Brebisson et al., "An Exploration of Softmax Alternatives Belonging to the Spherical Loss Family," In *Proc.* ICLR, pp. 1-9, 2016.
Devlin et al., "Fast and Robust Neural Network Joint Models for Statistical Machine Translation," In *Proc.* ACL, pp. 1270-1280, 2014.
Graves et al., "Speech Recognition with Deep Recurrent Neural Networks," In *Proc.* ICASSP, pp. 6645-6649, 2013.
Hochreiter et al., "Long Short-Term Memory," Neural Computation, vol. 9, pp. 1735-1780, 1997.
Ji et al., "BlackOut: Speeding Up Recurrent Neural Network Language Models with Very Large Vocabularies," In *Proc.* ICLR, pp. 1-14, 2016.
Jozefowicz et al., "Exploring the Limits of Language Modeling," 2016.
Luong et al., "Effective Approaches to Attention-based Neural Machine Translation," In *Proc.* EMNLP, 2015.
Mikolov et al., "Distributed Representations of Words and Phrases and their Compositionality," In *Proc.* NIPS, pp. 1-9, 2013.
Mnih et al., "Learning word embeddings efficiently with noise-contrastive estimation," In *Proc.* NIPS, pp. 2265-2273, 2013.
Morin et al., "Hierarchical Probabilistic Neural Network Language Model," In Robert G. Cowell and Zoubin Ghahramani (eds.), *Proc.* AISTATS, pp. 246-252, 2005.
Oda et al., "Neural Machine Translation via Binary Code Prediction," In *Proc.* ACL, 2017.
Paulus et al., "A Deep Reinforced Model for Abstractive Summarization," In *Proc.* ICLR, pp. 1-13, 2018.
Pennington et al., "GloVe: Global Vectors for Word Representation," In *Proc.* EMNLP, 2014.
Pinter et al., "Mimicking Word Embeddings using Subword RNNs," In *Proc.* EMNLP, 2017.
Ruder et al., "A Survey of Cross-lingual Word Embedding Models," Journal of Artificial Research, pp. 1-61, 1993.
Rush et al., "A Neural Attention Model for Abstractive Sentence Summarization," In *Proc.* EMNLP, 2015.
See et al., "Get to the Point: Summarization with Pointer-Generator Networks," In *Proc.* ACL, pp. 1073-1083, 2017.
Sennrich et al., "Neural Machine Translation of Rare Words with Subword Units," In *Proc.* ACL, 2016.
Sutskever et al., "Sequence to Sequence Learning with Neural Networks," In *Proc.* NIPS, pp. 3104-3112, 2014.
Vinyals et al., "A Neural Conversational Model," CoRR, abs/1506.05869, 2015.
Xiong et al., "Toward Human Parity in Conversational Speech Recognition," IEEE/ACM Transactions in Audio, Speech, and Language Processing, vol. 25, No. 10, pp. 2410-2423, 2017.
Yin et al., "Neural Generative Question Answering," CoRR, abs/1512.01337, 2015.

* cited by examiner

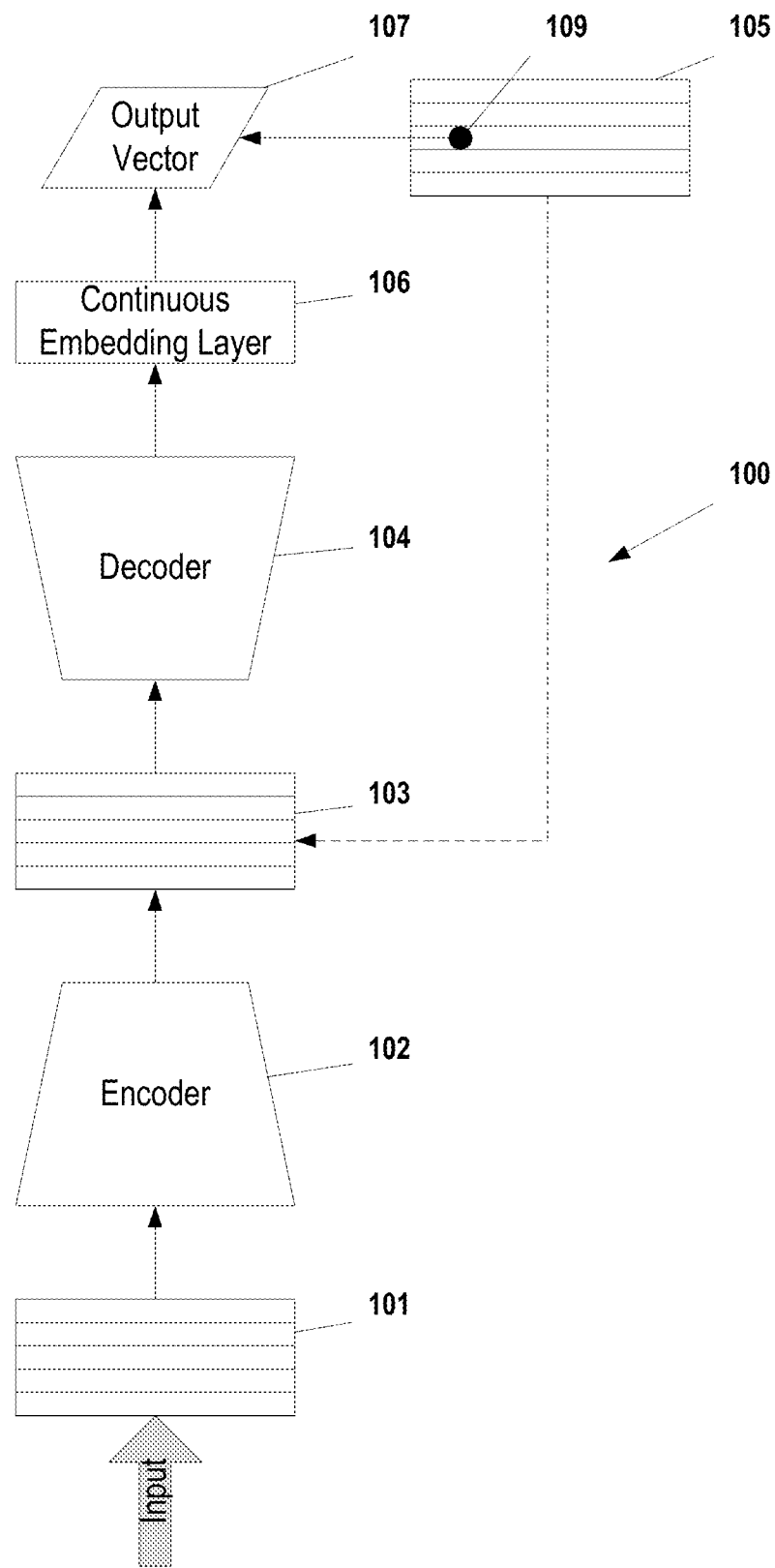

SEQUENCE GENERATION USING NEURAL NETWORKS WITH CONTINUOUS OUTPUTS

PRIORITY

The present application claims priority to U.S. Provisional Patent Application No. 62/697,654, titled SEQUENCE GENERATION USING RECURRENT NEURAL NETWORKS WITH CONTINUOUS OUTPUTS, filed Jul. 13, 2018, the entire disclosure of which is hereby incorporated by reference herein in its entirety.

BACKGROUND

Traditionally, neural machine translation (NMT) models (or any natural language generation models) use one-hot representations for each word in the output vocabulary V. More formally, each word w is represented as a unique vector $o(w) \in 62/\{0,1\}^V$ where V is the size of the output vocabulary and only one entry id(w) (which corresponds to the word ID of w in the vocabulary) in o(w) is 1 and the rest are set to 0. The models produce a distribution pt over output vocabulary at every step t using the softmax function. In these conventional NMT models, every decoding step involves a large matrix multiplication followed by a softmax layer, which is both computationally expensive and parameter heavy.

SUMMARY

In one general aspect, a machine learning system having a continuous embedding output layer is provided. The machine learning system can include an encoder, a decoder, and the continuous embedding output layer, which generates a continuous vector that is provided to a continuous valued embedding table. Accordingly, the continuous valued embedding table outputs the list of word IDs which are close (e.g., nearest) neighbors of the generated continuous vector.

In another general aspect, a method for training the aforementioned machine learning system is provided. The method includes implementing a class of loss functions based on cosine similarity between vectors. In one aspect, the machine learning system is trained by minimizing the regularized log likelihood of a probabilistic directional distribution.

FIGURES

Various embodiments of the present invention are described herein by way of example in conjunction with the following figures.

FIG. 1A illustrates a block diagram of a machine learning system during training time, in accordance with at least one aspect of the present disclosure.

DESCRIPTION

Certain aspects will now be described to provide an overall understanding of the principles of the structure, function, manufacture, and use of the devices and methods disclosed herein. One or more examples of these aspects are illustrated in the accompanying drawings. Those of ordinary skill in the art will understand that the devices and methods specifically described herein and illustrated in the accompanying drawings are non-limiting examples aspects and that the scope of the various aspects is defined solely by the claims. The features illustrated or described in connection with one aspect may be combined with the features of other aspects. Such modifications and variations are intended to be included within the scope of the claims. Furthermore, unless otherwise indicated, the terms and expressions employed herein have been chosen for the purpose of describing the illustrative aspects for the convenience of the reader and are not to limit the scope thereof.

Figure 1B:
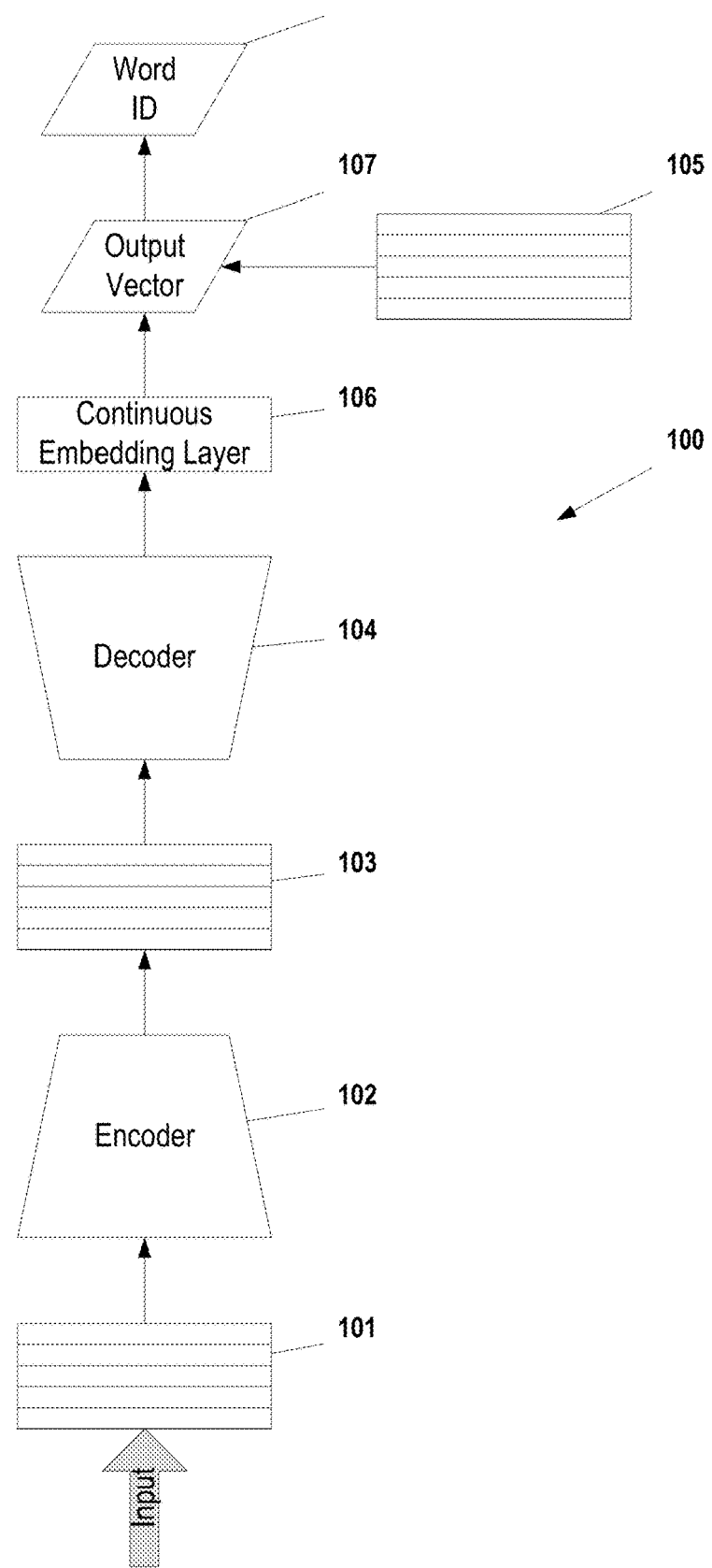
FIG. 1B illustrates a block diagram of a machine learning system during inference time, in accordance with at least one aspect of the present disclosure.

FIGS. 1A and 1B illustrate block diagrams of a machine learning system during training time and inference time, respectively, in accordance with at least one aspect of the present disclosure. The machine learning system 100 includes an encoder 102 that receives an input, a decoder 104, and a continuous embedding output layer 106. The encoder 102 and decoder 104 can each include one or more machine learnings systems, such as recurrent neural networks. The encoder 102 includes, for example, a bidirectional encoder including one bidirectional long short-term memory (LSTM) layer. The decoder 104 includes, for example, an attentional decoder including two LSTM layers. The encoder 102 is provided with an embedding table 101 and the decoder 104 is provided with an input embedding table 103 and an output embedding table 105. In some implementations, the decoder input embedding table 103 and the decoder output embedding table 105 can be the same embedding table or different embedding tables. The input provided to the encoder 102 can include, for example, a text string, an audio signal (representing, e.g., spoken words), and other sequences.

Conventional neural networks for language generation and other sequence-to-sequence applications utilize a softmax output layer; however, the present machine learning system includes the continuous embedding output layer 106 in place of the conventional softmax output layer. The continuous embedding output layer 106 maps the output of the decoder 102 to an m-dimensional vector space, where m<<V and V is the size of the output vocabulary, in the output embedding table 105. The output vocabulary can include output words from one or more languages. Each output word in the continuous embedding output layer 106 is represented by a continuous vector $e(w) \in \mathbb{R}^m$. In some implementations, the output embeddings in the output embedding table 105 can be pre-trained via various embedding models, such as word2vec and fasttext, to map the output words of the selected vocabulary to the embedding space. In other implementations, the output embeddings in the output embedding table 105 can be learned during training time. In some implementations, the output embedding table 105 can be the same embedding table or a different embedding table than the encoder input embedding table 101 and/or decoder input embedding table 103.

At training time, as illustrated in FIG. 1A, the continuous embedding output layer 106 is programmed to compare the output vector 107 to an expected word ID 109 from the output embedding table 105. In sum, the machine learning system 100 receives an input (i.e., training data), processes the input through the encoder 102, the decoder 104, and the continuous embedding layer 106 to generate a continuous output vector 107, and then minimizes a loss function derived from the cosine similarity between vectors (e.g., the regularized log likelihood of the von Mises-Fisher (vMF) distribution, threshold-based cosine, or max-margin with a negative example) comparing the output vector 107 and the expected word ID 109 (which is likewise represented by a continuous vector within the embedding space of the output embedding table 105). Accordingly, the decoder 104 is trained to generate a continuous output vector 107 that corresponds to a correct word ID from the output embedding table 105 for the given input. In some implementations, the embeddings from the output embedding table 105 can be shared with the decoder input embedding table 103 (as depicted in FIG. 1A) and/or the encoder input embedding table 101. These steps are repeated for each word or item in each sequence received in the input (i.e., the training data). The training of the machine learning system 100 can be controlled by, e.g., a training module 210 discussed below in connection with FIG. 2.

At inference time, as illustrated in FIG. 1B, the continuous embedding output layer 106 outputs the continuous output vector 107 and searches for the list of close neighbors (via, e.g., a variant of a k-nearest neighbor algorithm) of the continuous output vector 107 within the embedding table 105 to output the corresponding word(s). In sum, the machine learning system 100 receives an input, processes the input through the encoder 102, the decoder 104, and the continuous embedding layer 106 to generate a continuous output vector 107, searches the output embedding table 105 with the continuous output vector 107, and then outputs the word ID 111 corresponding to a close neighbor in the vector space of the generated continuous output vector 107 (e.g., the nearest neighbor) from the output embedding table 105. These steps are repeated for each word or item in each sequence received in the input. In one embodiment, the aforementioned steps can be repeated until a special end of sequence word is generated.

Figure 3:
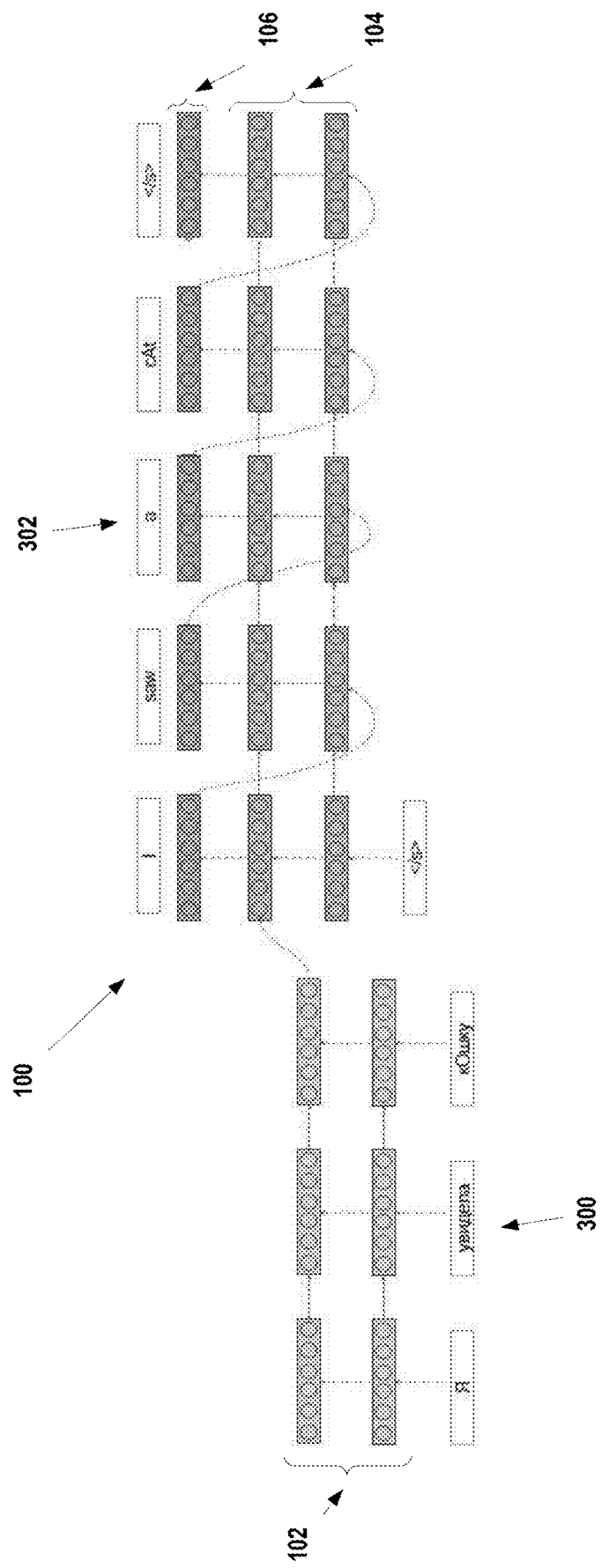
FIG. 3 illustrates a flow diagram of the machine learning system translating an input phrase, in accordance with at least one aspect of the present disclosure.

In one specific example depicted in FIG. 3 wherein the machine learning system 100 is implemented for translation, the machine learning system 100 receives an input phrase 300 in Russian. Accordingly, the system 100 processes each word in the input phrase 300 through the encoder 102, decoder 104, and continuous embedding layer 106, as described above, to generate an output phrase 302. In this example, the encoder 102 and decoder 104 are programmed to generate a continuous output vector 107 from a received Russian word. Further, the continuous output embedding layer 106 is programmed such that each continuous vector in the output embedding table 105 corresponds to an English language word. Thus, the machine learning system 100 translates received input phrases 300 from Russian to English.

Figure 2:
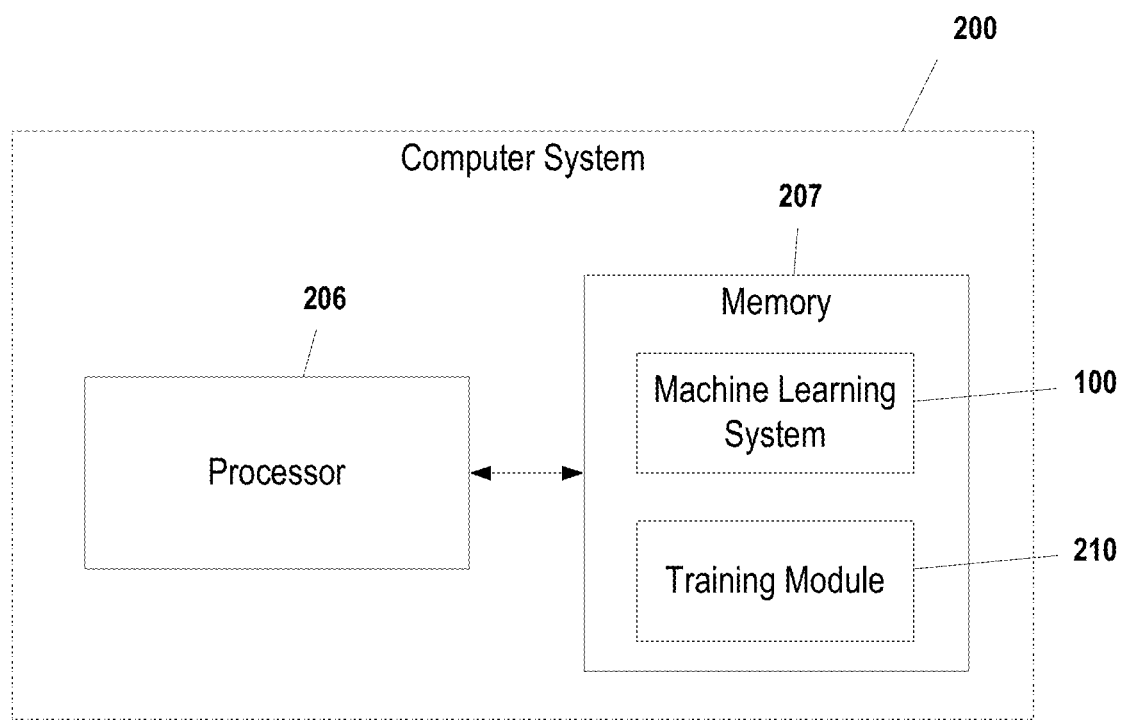
FIG. 2 illustrates a block diagram of a computer system for implementing the machine learning system illustrated in FIGS. 1A and 1B, in accordance with at least one aspect of the present disclosure.

FIG. 2 is a block diagram of a computer system 200 for executing the machine learning system illustrated in FIG. 1, in accordance with one or more aspects of the present disclosure. The computer system 200 comprises a set of one or more processor cores 206 and a memory 207 (e.g., primary storage, such as RAM, or secondary storage, such as ROM or a HDD) for storing the machine learning system 100 illustrated in FIGS. 1 and 1B and the corresponding training module 210 for training the machine learning system 100. The processor cores 206 can be CPU cores, cores of a graphical processing unit (GPU), and/or cores of an AI accelerator chip, e.g., a tensor processing unit (TPU) or other suitable AI accelerator chip.

The training module 210 consists of a set of program instructions for, when executed by the processor cores 206, training the machine learning system 100. The training module can include instructions for training the machine learning system 100 on training data, such as the IWSLT16 dataset, WMT'16 monolingual datasets, and so on. The training module 210 can be programmed to utilize a probabilistic loss function. For example, the training module 210 can program the processor cores 206 to train the machine learning system 100 by minimizing the regularized log likelihood of the vMF distribution. The regularized log likelihood of the vMF distribution at each output step is given by:

$$\text{NLLvMF}(\hat{e}; e(w)) = -\log(C_m \|\hat{e}\|) - \hat{e}^T e(w)$$

where the output of the model at each step is a vector $\hat{e}$ of dimension m, $C_m$ is the normalization term, and e(w) is a vector of dimension m. Notably, normalization is not performed by summing over the entire vocabulary, which makes the training much less computationally intense and thus faster than the training using a conventional softmax layer. In another example, the training module 210 can program the processor cores 206 to implement a variant of the above loss function including the term $\lambda_1 \|\hat{e}\|$, where $\lambda_1$ is a scalar hyperparameter. This results in the following algorithm:

$$\text{NLLvMF}_{reg1}(\hat{e}; e(w)) = -\log(C_m \|\hat{e}\|) - \hat{e}^T e(w) + \lambda_1 \|\hat{e}\|$$

In yet another example, the training module 210 can be programmed to implement another variant of the above loss function:

$$\text{NLLvMF}_{reg2}(\hat{e}; e(w)) = -\log(C_m \|\hat{e}\|) - \lambda_2 \hat{e}^T e(w)$$

Embodiments of the present invention can be used in a variety of applications. For example, the presently described machine learning system can be utilized in translation, summarization, speech recognition, and other sequence-to-sequence applications; image-to-sequence applications (via, e.g., replacing the encoder illustrated in FIG. 1); and character-to-sequence applications. As such, in various embodiments, machine learning systems of the present invention can be combined with output devices such as display screens, speakers, etc. to output the generated sequences, particularly at inference time.

Additional details regarding the described systems and processes may be found in the following, which is hereby incorporated by reference herein in its entirety: Kumar, Sachin, and Yulia Tsvetkov. "Von Mises-Fisher Loss for Training Sequence to Sequence Models with Continuous Outputs." arXiv preprint arXiv:1812.04616 (2018).

Each processor for the systems described in connection with FIG. 2 could have one or multiple cores. The cores could be CPU, GPU, or AI accelerator cores, for example. For example, in an embodiment with multiple CPU cores, one set of cores could execute the program instructions for the training module 210, another set for the machine learning system 100, and so on. GPU cores operate in parallel and, hence, can typically process data more efficiently that a collection of CPU cores, but all the cores execute the same code at one time. The memory unit(s) may comprise computer memory that is accessible by the processing cores, such as RAM, ROM, processor registers or processor cache, for example.

The software for the various machine learning systems described herein, such as the modules described in FIG. 2, and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C #, COBOL, Fortran, Java, Lisp, Pascal, Object Pascal, Haskell, ML; and examples of scripting languages include Bourne script, JavaScript, Python, Ruby, Lua, PHP, and Perl.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals). Accordingly, the non-transitory computer-readable medium includes any type of tangible machine-readable medium suitable for storing or transmitting electronic instructions or information in a form readable by a machine (e.g., a computer).

As used in any aspect herein, the term "logic" may refer to an app, software, firmware and/or circuitry configured to perform any of the aforementioned operations. Software may be embodied as a software package, code, instructions, instruction sets and/or data recorded on a non-transitory computer readable storage medium. Firmware may be embodied as code, instructions or instruction sets and/or data that are hard-coded (e.g., nonvolatile) in memory devices.

As used in any aspect herein, the terms "component," "system," "module," and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states that may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

The invention claimed is:

1. A computer system for mapping an input string to an output string from a set of N strings, the computer system comprising:
a processor; and
a memory storing:
a machine learning system comprising:
an encoder;
a decoder;
a continuous embedding output layer configured to map an output of the decoder to an m-dimensional vector space; and
an output embedding table storing a plurality of continuous vectors mapped to the m-dimensional vector space;
wherein m<N; and
instructions that, when executed by the processor, cause the computer system to:
process the input string through the encoder and the decoder to produce an output vector;
determine which of the plurality of continuous vectors within the output embedding table the output vector corresponds to; and
output the output string corresponding to the determined continuous vector.

2. The computer system of claim 1, wherein the encoder comprises a bidirectional encoder.

3. The computer system of claim 1, wherein the decoder comprises an attentional decoder.

4. The computer system of claim 1, wherein the input string includes a word in a first language and the set of N strings include words in a second language.

5. The computer system of claim 1, wherein the instructions are configured to cause the computer system to determine which of the plurality of continuous vectors the output vector corresponds to in the m-dimensional vector space via a k-nearest neighbor algorithm.

6. A computer system for training a machine learning system to map an input string to an output string from a set of N strings, the computer system comprising:
a processor; and
a memory storing:
the machine learning system comprising:
an encoder;
a decoder;
a continuous embedding output layer configured to map an output of the decoder to an m-dimensional vector space; and
an output embedding table storing a plurality of continuous vectors mapped to the m-dimensional vector space;
wherein m<N; and
instructions that, when executed by the processor, cause the computer system to:
process the input string through the encoder and the decoder to produce an output vector;
determine which of the plurality of continuous vectors within the output embedding table that the output vector corresponds to; and
minimize a cosine-based loss function according to the determined continuous vector compared to an expected output for the input string.

7. The computer system of claim 6, wherein the cosine-based loss function comprises a regularized log likelihood of a von Mises-Fisher (vMF) distribution.

8. The computer system of claim 6, wherein the expected output is defined by an embedding table provided to at least one of the encoder or the decoder.

9. The computer system of claim 6, wherein the encoder comprises a bidirectional encoder.

10. The computer system of claim 6, wherein the decoder comprises an attentional decoder.

11. The computer system of claim 6, wherein the input string includes a word in a first language and the set of N strings include words in a second language.

12. The computer system of claim 6, wherein the instructions are configured to cause the computer system to determine which of the plurality of continuous vectors the output vector corresponds to in the m-dimensional vector space via a k-nearest neighbor algorithm.

13. A machine learning system for mapping an input string to an output string from a set of N strings, the machine learning system comprising:
   an encoder;
   a decoder;
   a continuous embedding output layer configured to map an output of the decoder to an m-dimensional vector space; and
   an output embedding table storing a plurality of continuous vectors mapped to the m-dimensional vector space; wherein m<N;
   wherein the machine learning system is programmed to:
      process the input string through the encoder and the decoder to produce an output vector;
      determine which of the plurality of continuous vectors within the output embedding table that the output vector corresponds to; and
      output the output string corresponding to the determined continuous vector.

14. The machine learning system of claim 13, wherein the encoder comprises a bidirectional encoder.

15. The machine learning system of claim 13, wherein the decoder comprises an attentional decoder.

16. The machine learning system of claim 13, wherein the input string includes a word in a first language and the set of N strings include words in a second language.

17. The machine learning system of claim 13, wherein the machine learning system is further programmed to determine which of the plurality of continuous vectors within the output embedding table that the output vector corresponds to via a k-nearest neighbor algorithm.

* * * * *